(12) United States Patent
Saitta

(10) Patent No.: US 6,898,559 B2
(45) Date of Patent: May 24, 2005

(54) SYSTEM FOR DYNAMIC AND AUTOMATIC BUILDING MAPPING

(75) Inventor: Paul A. Saitta, Lakewood, CO (US)

(73) Assignee: Tracker R&D, LLC, Longmont, CO (US)

( * ) Notice: Subject to any disclaimer, the term of this patent is extended or adjusted under 35 U.S.C. 154(b) by 965 days.

(21) Appl. No.: 09/733,121

(22) Filed: Dec. 8, 2000

(65) Prior Publication Data

US 2002/0072881 A1 Jun. 13, 2002

(51) Int. Cl.$^7$ .............................................. G06F 17/50
(52) U.S. Cl. ...................... 703/1; 342/357.08; 701/208; 702/95
(58) Field of Search .............................. 703/1; 701/207, 701/208, 213, 214; 342/357.02, 357.06, 357.08; 702/94, 95

(56) References Cited

U.S. PATENT DOCUMENTS

| | | | | |
|---|---|---|---|---|
| 5,902,347 A | * | 5/1999 | Backman et al. | ........... 701/200 |
| 5,938,709 A | * | 8/1999 | Hale et al. | ..................... 701/50 |
| 6,208,933 B1 | * | 3/2001 | Lazar | ......................... 701/207 |
| 6,236,938 B1 | * | 5/2001 | Atkinson et al. | ........... 701/214 |

* cited by examiner

Primary Examiner—Albert W. Paladini
(74) Attorney, Agent, or Firm—Patton Boggs LLP

(57) ABSTRACT

The automatic building mapping system comprises a tracker module that can be carried by a user and an optional command module which operate to automatically map the rooms of a building as a user traverses the rooms of the building. The tracker module includes a transducer system that determines the present distance from the user to each of the walls of the room, the location of openings in the walls as well as an inertial guidance system that precisely locates the user with respect to a known reference point. The data produced by the tracker module of the automatic building mapping system can be transmitted to a centrally located command module so that multiple units can simultaneously be tracked and a mapping of the building effected from different perspectives to thereby create an accurate composite layout map. In addition, the user can receive a heads-up display to enable the user to visualize the layout of the building as the user traverses the various rooms of the building, and as concurrently mapped by other users in the building. Thus, an accurate virtual map can be created on demand by the users moving through the rooms of the building.

28 Claims, 4 Drawing Sheets

SYSTEM FOR DYNAMIC AND AUTOMATIC BUILDING MAPPING

FIELD OF THE INVENTION

This invention relates to automated mapping systems and in particular to a system for automatically mapping the interior space of a building on a dynamic basis as an individual traverses the various rooms of the building.

Problem

It is a problem in the field of building mapping to generate an accurate layout of the rooms of a building in an efficient and inexpensive manner and to have such a layout available for use in a computerized manner. The mapping of the rooms of a building has historically been done manually, with the results being recorded on paper and stored in a municipally maintained central archive library. Unfortunately, these paper records are infrequently updated and the records are therefore largely inaccurate. Furthermore, access to these paper records is burdensome. Existing automated building mapping systems typically comprise systems that convert these paper records to a computer-based format for easy retrieval and use. Again, these records are not updated with any regularity and the integrity of the data stored in these systems is therefore compromised. Any automated building mapping systems that dynamically and electronically map the room layout rely on complex and often difficult to transport apparatus to laboriously map out the interior spaces of a building. The resultant room mapping process results in an efficient and accurate layout, but at the cost of an extensive amount labor and time required to execute the process. Therefore, it is atypical to have an accurate layout of the rooms of a building on demand.

This lack of an accurate layout of the rooms of a building on demand is particularly a problem in situations where adverse conditions exist in the building, such as a fire in a building, especially where the building has not previously been mapped or the existing map has not been updated. In this Environment, the fire fighting personnel not only fight the fire, but also need to delimit the boundaries of each room that is traversed and to locate doorways in each room. The need to map the rooms of a building as the fire fighter travels through the building relates to many problems that can occur in a typical environment: the fire fighter's air supply reaches exhaustion, or the fire fighter encounters the situation where traversing the route taken through the building is now blocked by the fire or debris, or it is not uncommon for the fire fighter to become disoriented and the fire fighter fails to identify the route out of the building, or the fire fighter is injured, and the like. In all of these situations, the lack of a map of the rooms of the building and the inability to precisely identify the location of the fire fighter hinder the evacuation or rescue of the fire fighter from the building, since the rooms in reality comprise a dangerous maze. The lack of both a map and the location of a fire fighter indicated on the map represents a common problem in this field.

Given the likely presence in the room of dense smoke and the threat of fire, toxic gases and the like, the use of the existing possibly inaccurate layout data is inadvisable. Therefore, the fire fighter proceeds through the rooms of the building blindly, without benefit of knowledge of the extent of each room, the doorways contained therein, and ultimately the path to an exit from the building. Therefore, the fire fighter has a difficult task to retrace his path through the rooms of the building to exit the building and if this path is blocked, to locate an alternative and safe path to an exit of the building. Unfortunately, there presently does not exist any system that can perform this task of automatically creating a virtual map of the rooms in a building and mapping a path to the building exit.

Solution

The above described problems are solved and a technical advance achieved by the present automatic building mapping system which comprises a tracker module that can be carried by a user and an optional command module which operate to automatically map the rooms of a building as a user traverses the rooms of the building. The tracker module includes a transducer system that determines the present distance from the user to each of the walls of the room, the location of openings in the walls and floor as well as an inertial guidance system that precisely locates the user with respect to a known reference point. The data produced by the tracker module of the automatic building mapping system can be transmitted to a centrally located command module so that multiple units can simultaneously be tracked and a mapping of the building effected from different perspectives to thereby create an accurate composite layout map. In addition, the user can receive a heads-up display to enable the user to visualize the layout of the building as the user traverses the various rooms of the building, and as concurrently mapped by other users in the building. Thus, an accurate virtual map can be created on demand by the users moving through the rooms of the building.

In addition, with the user location data being available in real time, the user can be guided through the building and, if necessary, to an exit in the shortest and safest path possible. Additional data can be collected by this unit and in the case of a fire fighter, typical data would be: ambient temperature, presence of toxic gasses, oxygen level in a breathing tank, time to exhaustion of breathable air in the breathing tank, user breathing rate and heart rate sensors, user time in area, a user failure to move indicator, command and control alerts, text readout of messages from the command and control system, voice activation of the unit including the display, location of other users in the vicinity, warning indications. This data is available to the user as well as the command module to enable both the user and staff at the command module to continuously monitor the activity and environment in the building. Thus, the automatic building mapping system overcomes the limitations of the presently available computerized building layout databases and also provides a significant number of additional capabilities.

DETAILED DESCRIPTION

Figure 1:
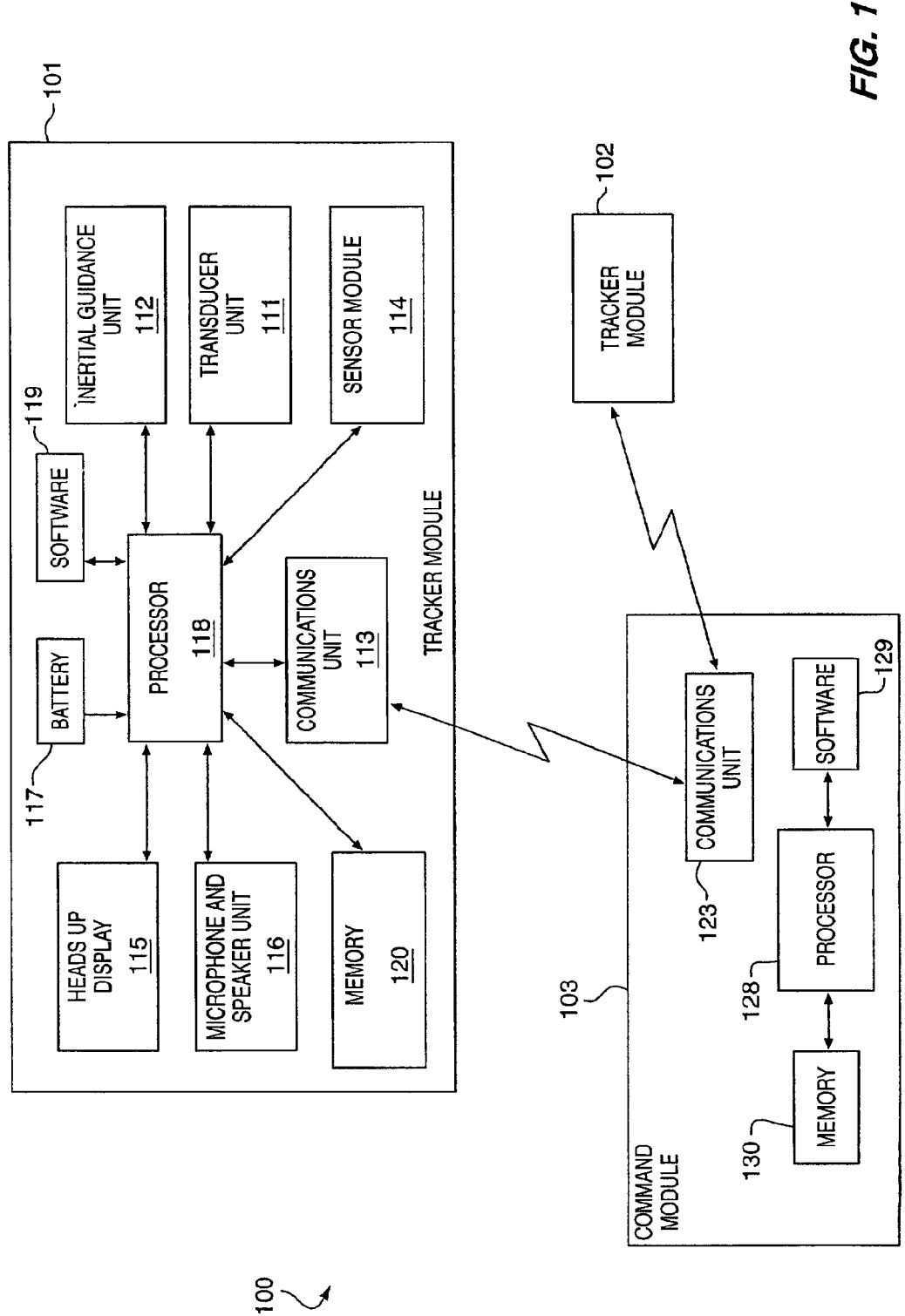
FIG. 1 illustrates in block diagram form the overall architecture of the present automatic building mapping system.
Figure 4A:
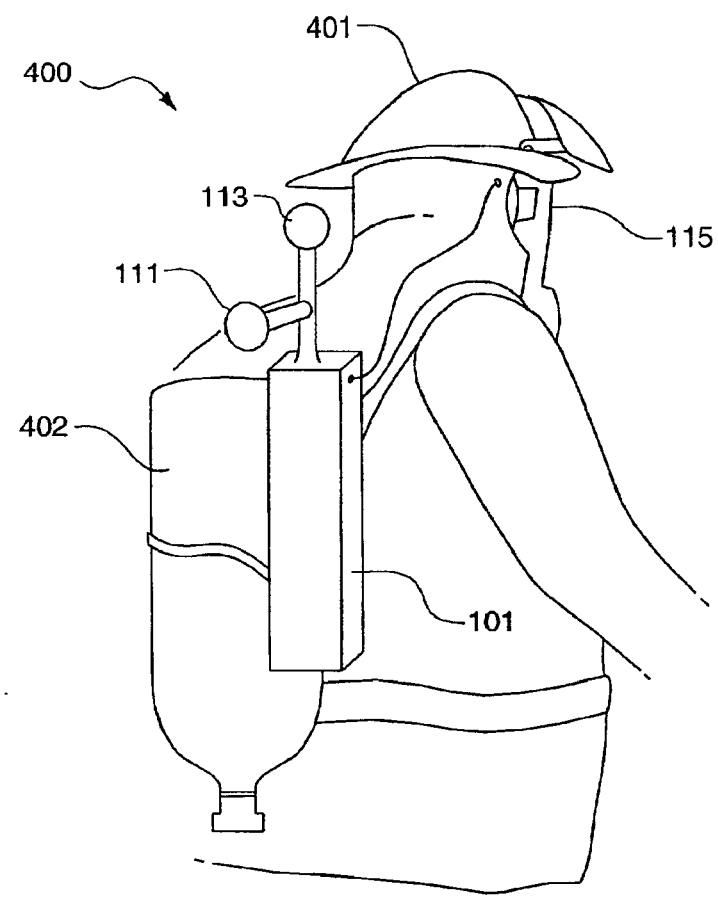
FIGS. 4A & 4B illustrate a rear perspective views of a user equipped with the present automatic building mapping system and a perspective view of the present automatic building mapping system, respectively.
Figure 4B:
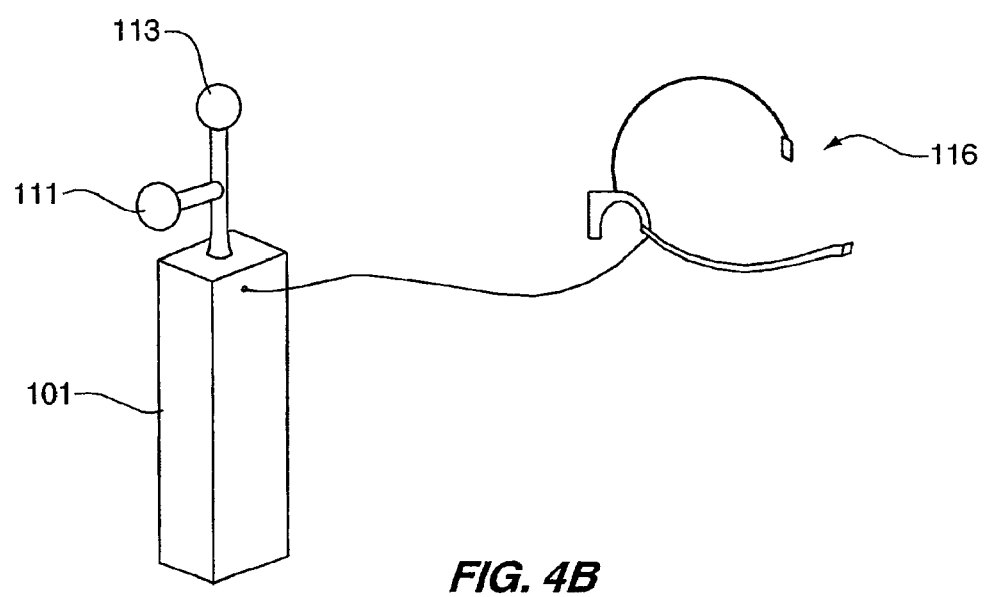

FIG. 1 illustrates in block diagram form the overall architecture of the present automatic building mapping system and FIGS. 4A & 4B illustrate a rear perspective views of a user equipped with the present automatic building mapping system and a perspective view of the present automatic building mapping system, respectively. The automatic building mapping system 100 comprises at least one tracker module 101, 102 that can be carried by a user and an optional centrally located command module 103 that operates in conjunction with the tracker units 101, 102 to automatically map the rooms of a building as a user traverses the rooms of the building.

The tracker module 101 can be implemented in many different configurations and, for the purpose of this description, is shown as a unit 101 that can be worn by a fire fighter 400 as part of their standard equipment. The fire fighter is typically equipped with a helmet 401 that has a face protective mask, as well as an air supply system 402 (commonly referred to as a SCBA unit), protective clothing and the like. The tracker module 101 can be mounted as part of the air supply system 402 or on a separate harness of other attachment that the user wears. The tracker module 101 includes a transducer system 111 that determines the present distance of the user from each of the walls of the room, and the location of openings in these walls, as well as the floor. An inertial guidance system 112 in the tracker module 101 precisely locates the user in the building and the rooms of the building with respect to a known reference point, as well as providing user movement and orientation information. Each tracker module 101 contains a processor 118, memory 120 (such as a disk drive or solid state memory), and software 119 that can be stored in additional memory (as shown) or in memory 120, and which software 119 executes on processor 118 to control the operation of the tracker module 101. The software 119 can write the data received from the transducer system 111 in memory 120, process this data in conjunction with the output data from the inertial guidance system 112 to generate a map of the user's path through the building and/or transmit this data to a centrally located command module 103, via a communications unit 113, for storage in memory 130 so that multiple tracker modules 101, 102 can simultaneously be tracked and a mapping of the building effected by the command module 103 from different perspectives to thereby create an accurate composite layout map of the building. Thus, an accurate virtual map of the building can be created on demand by the users moving through the rooms of the building, with the map being generated by the tracker module 101 and/or the command module 103. The command module 103 transmits updated map information, based on the data received from all of the tracker modules 101, 102 to memory 120. If communications are disrupted, the memory 120 has stored therein a copy of the map of the building updated to a point in time when communications with the command module 103 were lost.

Additional data can be collected by a sensor module 114 located in the tracker module 101 which can measure various predetermined parameters such as: ambient temperature, presence of toxic gasses, oxygen level in the user's breathing tank, time to exhaustion of breathable air in the breathing tank, user breathing rate and heart rate sensors, user time in area, a user failure to move indicator, command and control alerts, text readout of messages received from the command module, voice activation of the tracker module including the display, location of other users in the vicinity via infrared scan, warning indications, and the like.

Tracker Module

The automatic building mapping system 100 therefore comprises a plurality of elements that are cooperatively operative to accurately create a virtual map of the rooms contained within a building. The primary element used in the automatic building mapping system 100 is the tracker module 101, powered by a battery 117, and equipped with a processor 118 that interfaces with and controls the operation of the: heads up display 115, microphone and speaker 116, inertial guidance unit 112, transducer unit 111, sensor module 114, and communications unit 113.

The inertial guidance unit 112 contains gyroscopes, accelerometers, and magnetometers, to measure the movement of the user through the rooms of the building. The inertial guidance unit 112 continuously measures the movements of the user, including rotation and acceleration, caused by walking and turning in any direction. The inertial guidance unit 112 also contains optional magnetometers to provide magnetic correction of the gyroscopes to ensure accurate reporting of the movement of the tracker module 101. The inertial guidance unit 112 is initialized as the user enters the building and transmits its data to the software 119 that executes on the processor 118.

The transducer unit 111 produces room measurement data that can be used to map the rooms of the building as well as correct the data produced by the inertial guidance unit 112. The transducer unit 111 operates by producing periodic "soundings" which determine the extent of the room in relation to the transducer unit 111. This is typically accomplished by periodically transmitting a signal, such as an acoustic signal, in the direction of the walls of the room, which acoustic signal is reflected off solid objects in its path and returned to the transducer unit 111. The time required for the acoustic signal to reach an object in its path and return is used to determine the distance to the solid object, even if it cannot be seen. The acoustic signal that is generated by the transducer unit 111 is typically in the form of a beam covering a predetermined angular range, such that the walls of the room are scanned from floor level to ceiling level, so that door and window openings are identified by the absence of reflected signal components. In addition, any step down or openings in the floor are detected, as well as obstructions protruding from the ceiling. While an acoustic signal was mentioned, the transducer can operate with any sounding technology, such as: radar, laser, sonar, infrared, and the like. Each reading taken by the transducer unit 111 results in the creation of a data entry in the processor 118 and command module 103 to create a data point on the virtual map. The transducer unit 111 is attached to the tracker module 101 in a manner where the relationship between the transducer unit 111 and the inertial guidance unit 112 is maintained constant to ensure consistent correlation between the two. Thus, the data produced by the transducer unit 111 is compared to the data produced by the inertial guidance unit 112 to maintain the accuracy of the user position data.

Tracker Module Sensors and Display

The tracker module 101 can include a sensor module 114 that is equipped with a plurality of sensor elements to measure various predetermined parameters as the user moves throughout the building. The sensor module 114 is in communication with the processor 118 and the sensor readings can be presented to the user via a heads-up display 115 (which can be an integral part of the face mask of the helmet 401 or an addition thereto) and/or transmitted the command module 103 via a radio frequency communication link, using communications unit 113. The sensors located in the sensor module 114 can measure and display numerous user related parameters as well as ambient parameters, such as: ambient temperature, presence of toxic gasses, oxygen level in the user's breathing apparatus air storage tank 402, time to exhaustion of breathable air in the user's breathing apparatus air storage tank 402, user's breathing rate and heart rate, user's time in area, a user failure to move indicator, command and control alerts, text readout of messages received from the command module, voice activation of the user module including the display, location of other users in vicinity, warning indication, and the like. The heads-up display 115 can display the map of the building as well as any warnings/alerts that are relevant to the user of tracker module 101. Furthermore, the heads-up display 115 can display ambient conditions data so the user can monitor the conditions in the present room environment. The number and types of data displayed can be under the control of the user and are typically managed as a function of the criticality of the data.

Command Module

The command module 103 can include a plurality of elements that are used to communicate with the various tracker modules 101, 102 that are operational within the building and which generate the virtual map of the building. In particular, the command module 103 includes a communications unit 123 that provides radio frequency communication with the tracker modules 101, 102 and the users via the microphone and speaker unit 116 in each tracker module 101, 102. The command module also includes a processor 128 and associated software 129 that receives the data from the transducer unit 111, inertial guidance unit 112, sensor module 114 in each of the tracker modules 101, 102 and integrates this received data to produce the composite map of the building as well as a mapping of the user's status and ambient conditions encountered in the building.

Operation of the Automatic Building Mapping System

Figure 2:
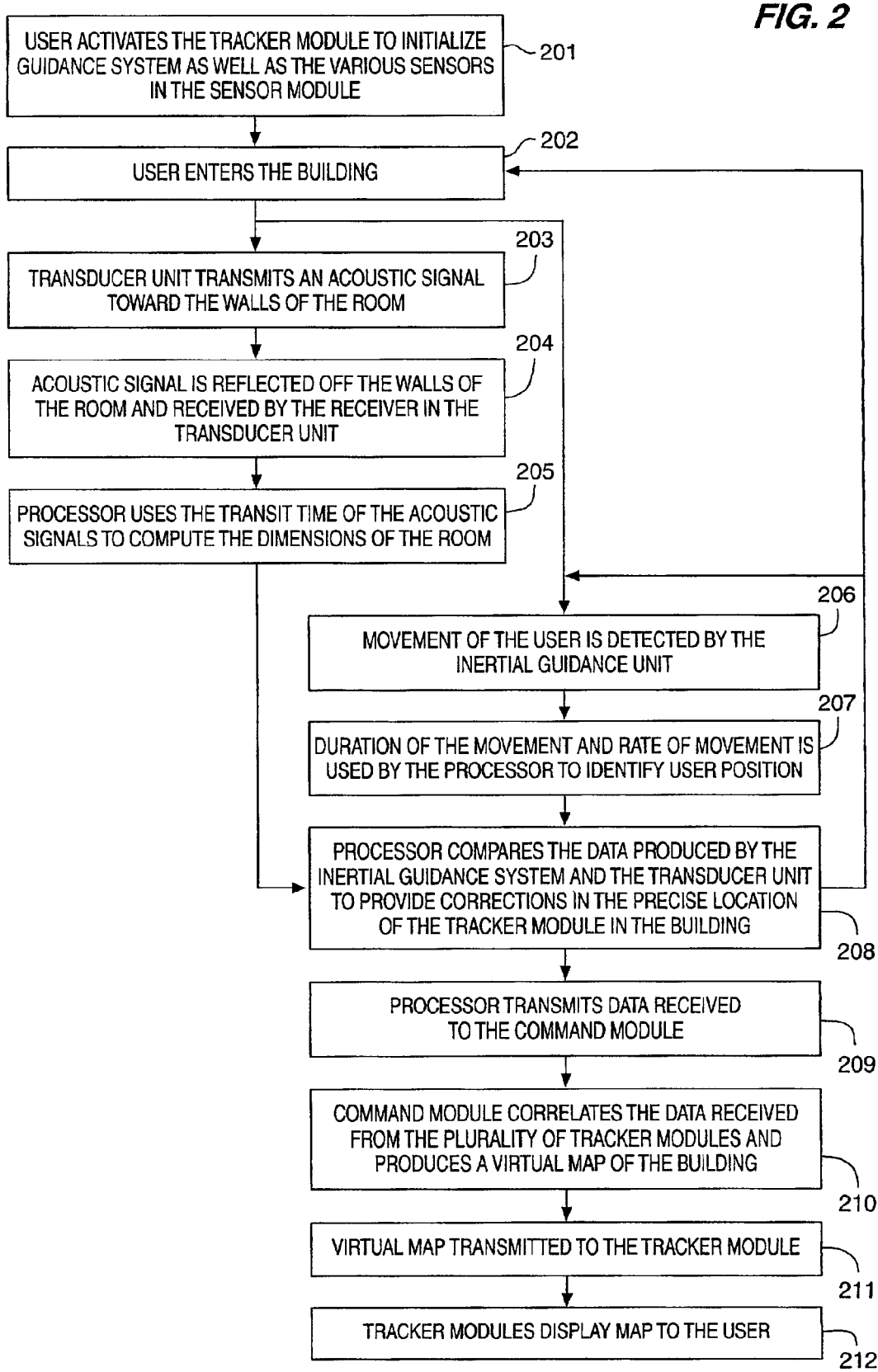
FIG. 2 illustrates in flow diagram the operation of the present automatic building mapping system.
Figure 3:
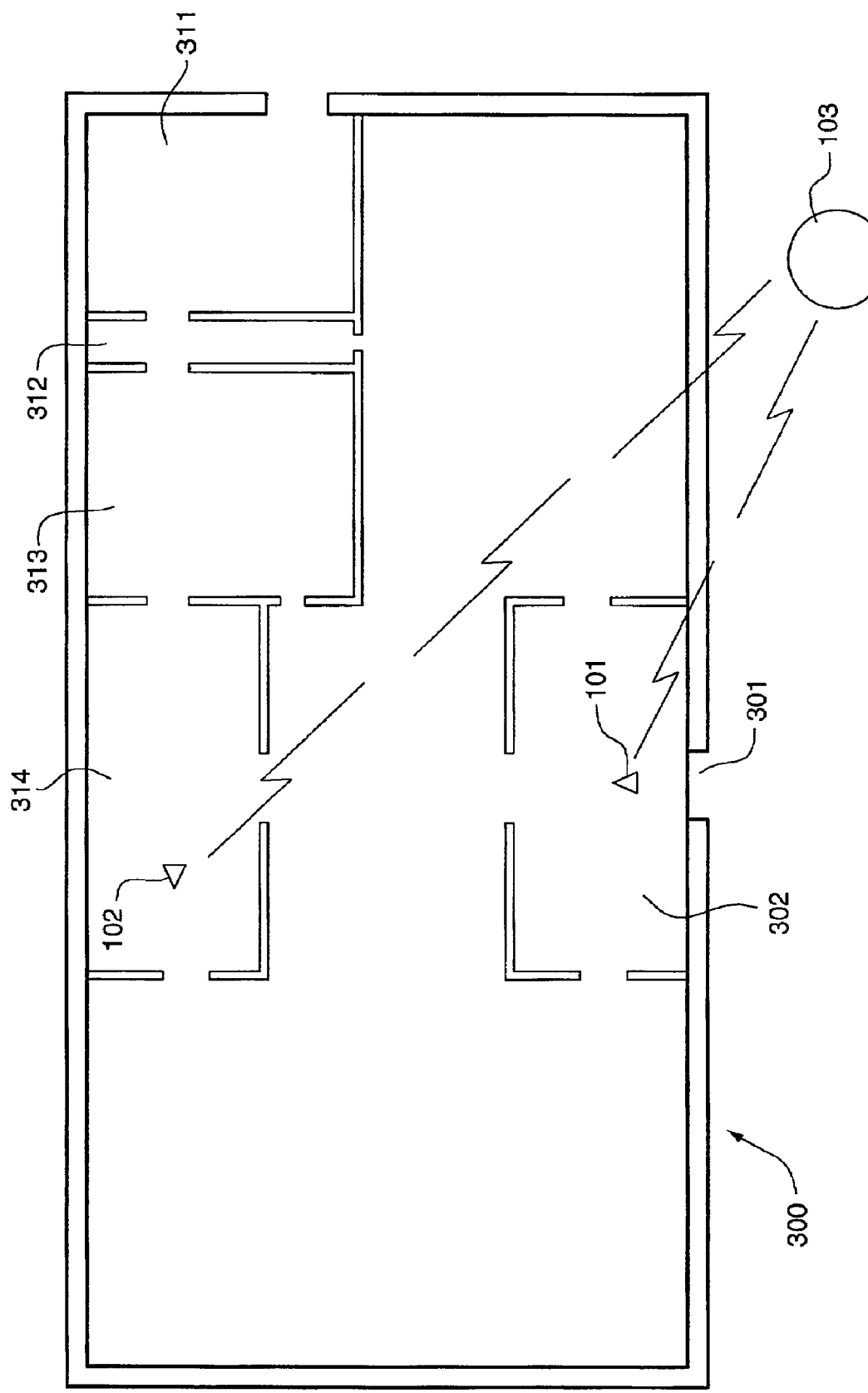
FIG. 3 illustrates a typical map generated by the present automatic building mapping system.

FIG. 2 illustrates in flow diagram the operation of the present automatic building mapping system 100 and FIG. 3 illustrates a typical map generated by the present automatic building mapping system 100. At step 201, the user, located at a building entrance 301, activates the tracker module 101 of the automatic building mapping system 100 to initialize the inertial guidance system 112 as well as the various sensors in the sensor module 114 to establish baseline values for all of the parameters that are measure by the automatic building mapping system 100. Therefore, the precise location of the tracker module 101 is identified to provide the mapping software 119, 129 with a point of reference with respect to a point of entry of the user into the building 300 to begin the building mapping process. At step 202, the user enters the building 300 and the extent of the room 302 entered by the user is measured by the acoustic signal transmitted at step 203 by the transducer unit 111 toward the walls of the room. The acoustic signal is typically output simultaneously in all directions so that all of the walls of the room 302 can be located with respect to the tracker module 101. This broadcast acoustic signal is reflected off of the walls of the room 302 and these reflected components of the broadcast signal are received by the receiver in the transducer unit 111 at step 204. The transit time of these acoustic signals broadcast from the transmitter of the transducer unit 111, reflected from the walls of the room 302 and returned to the receiver of the transducer unit 111 is indicative of the distance of the walls of the room 302 from the tracker module 101. The processor 118 uses the transit time of the acoustic signals to compute at step 205 the dimensions of the room 302 that the user is presently is located in.

The position and orientation of the tracker module 101 within the room 302 is also identified by the inertial guidance system 112 in terms of the rotational position of the user, and the lateral position of the user as determined by the gyroscopes, accelerometers and magnetometers located within the inertial guidance unit 112. Thus, in FIG. 3, the location and direction of movement of the tracker modules 101, 102 are indicated by arrow-shaped symbols. In particular, in well known fashion, any movement of the user is detected by these sensors at step 206 and the duration of the movement and rate of movement is used by the processor 118 at step 207 to identify user position in terms of linear movement from the user entry point into the building 301 to the present location. The gyroscopes identify any roll, pitch and yaw, all of which data is used to compute the user position and orientation in well known fashion. The processor 118 can compare the data produced by the inertial guidance system 112 and the transducer unit 111 at step 208 to provide "mid-course" corrections in terms of the precise location of the tracker module 101 in the building.

At step 209, the processor 118 transmits the data received from the transducer unit 111, inertial guidance unit 112 and sensor module 114 to the command module 103 via the radio frequency communication channel established communications unit 113. This transmitted data can be raw data or partially processed data, in the form of data output by the processor 118 as a result of the software 119 providing an initial computation of the position of the tracker module 101, extent of the rooms, computed state of the variables measured by the sensor module 114 and the like. At step 210, the command module 103 correlates the data received from the plurality of tracker modules 101, 102 and produces a virtual map of the building as the users move with their respective tracker modules 101, 102 through the building. The virtual map can be transmitted at step 211 by the command module 103 to the tracker modules 101, 102 for display to the user at step 212 via the heads-up display 115.

The user(s) then proceed through various rooms of the building (such as 311–314 for tracker module 102) and the automatic building mapping system 100 maps the path of each tracker module as steps 202–212 are repeated on a continuous basis.

SUMMARY

The automatic building mapping system comprises a set of equipment that can be carried by a user to dynamically create an accurate virtual map on demand by the users moving through the rooms of the building.

What is claimed:

1. A system for the automatic mapping of a user's position relative to an interior of a building, comprising a plurality of interconnected rooms, comprising:

means, transportable by said user, for generating data indicative of a distance between said user and walls of a room in which said user is presently located;

means for locating said position of said user in said building; and means for cumulatively mapping the extent of each room in which said user is located and said user's position relative to said room to produce a map of an interior of said building.

2. The system for the automatic mapping of a user's position relative to an interior of a building of claim 1 wherein said means for generating data comprises:

means for transmitting a signal toward said walls of said room;

means for receiving components of said transmitted signal reflected off said walls of said room; and means for determining a distance from said user to said walls as a function of the time difference between transmitting said signal and receipt of said reflected components of said transmitted signal.

3. The system for the automatic mapping of a user's position relative to an interior of a building of claim 2 wherein said means for generating data further comprises:

means for identifying a presence of an opening in said walls.

4. The system for the automatic mapping of a user's position relative to an interior of a building of claim 1 wherein said means for generating data comprises:

means for concurrently measuring a distance between a user and a plurality of walls of a room in which the user is presently located.

5. The system for the automatic mapping of a user's position relative to an interior of a building of claim 1 wherein said means for locating comprises:

inertial guidance means for dynamically measuring movement of said user as said user moves through said rooms of said building.

6. The system for the automatic mapping of a user's position relative to an interior of a building of claim 5 wherein said means for locating further comprises:

means for dynamically measuring movement of said user using at least one of movement sensors comprising: gyroscope, accelerometer, rotation detector.

7. The system for the automatic mapping of a user's position relative to an interior of a building of claim 1 wherein said means for cumulatively mapping comprises:

means for creating a virtual map of said building using said generated distance data and said user location data for each room traversed by said user.

8. The system for the automatic mapping of a user's position relative to an interior of a building of claim 1 further comprising:

sensor means for measuring at least one of building and user parameters: ambient temperature, presence of toxic gasses, oxygen level in a breathing tank, time to exhaustion of breathable air in the breathing tank, user breathing rate and heart rate sensors, user time in area, a user failure to move indicator, command and control alerts, text readout of messages from the command and control system, voice activation of the unit including the display, location of other users in the vicinity, warning indications.

9. The system for the automatic mapping of a user's position relative to an interior of a building of claim 1 further comprising:

means for displaying said map to said user.

10. A method of automatic mapping of a user's position relative to an interior of a building, comprising a plurality of interconnected rooms, comprising the steps of:

generating, using apparatus transportable by said user, data indicative of a distance between said user and walls of a room in which said user is presently located;

locating a position of said user in said building; and cumulatively mapping the extent of each room in which said user is located and said user's position relative to said room to produce a map of an interior of said building.

11. The method of automatic mapping of a user's position relative to an interior of a building of claim 10 wherein said step of generating data comprises:

transmitting a signal to said walls of said room;

receiving components of said transmitted signal reflected off said walls of said room; and determining a distance from said user to said walls as a function of the time difference between transmitting said signal and receipt of said reflected components of said transmitted signal.

12. The method of automatic mapping of a user's position relative to an interior of a building of claim 11 wherein said step of generating data further comprises:

identifying a presence of an opening in said walls.

13. The method of automatic mapping of a user's position relative to an interior of a building of claim 10 wherein said step of generating data comprises;

concurrently measuring a distance between a user and a plurality of walls of a room in which the user is presently located.

14. The method of automatic mapping of a user's position relative to an interior of a building of claim 10 wherein said step of locating comprises:

dynamically measuring movement of said user via an inertial guidance apparatus as said user moves through said rooms of said building.

15. The method of automatic mapping of a user's position relative to an interior of a building of claim 14 wherein said step of locating further comprises:

dynamically measuring movement of said user using at least one of movement sensors comprising: gyroscope, accelerometer, rotation detector.

16. The method of automatic mapping of a user's position relative to an interior of a building of claim 10 wherein said step of cumulatively mapping comprises:

creating a virtual map of said building using said generated distance data and said user location data for each room traversed by said user.

17. The method of automatic mapping of a user's position relative to an interior of a building of claim 10 further comprising the step of:

measuring at least one of building and user parameters; ambient temperature. presence of toxic gasses, oxygen level in a breathing tank, time to exhaustion of breathable air in the breathing tank, user breathing rate and heart rats sensors, user time in area, a user failure to move indicator, command and control alerts, text readout of messages from the command and control system, voice activation of the unit including the display, location of other users in the vicinity, warning indications.

18. The method of automatic mapping of a user's position relative to an interior of a building of claim 10 further comprising the step of:

displaying said map to said user.

19. A system for the automatic mapping a user's position relative to of an interior of a building, comprising a plurality of interconnected rooms, comprising:

tracker module means, transportable by said user, comprising:

transducer means for generating data indicative of a distance between a user and walls of a room in which said user is presently located, inertial guidance means for generating data indicative of a position of said user in said building; and command module means for cumulatively mapping the extent of each room in which said user is located and said user's position relative to said room to produce a map of an interior of said building.

20. The system for the automatic mapping of a user's position relative to an interior of a building of claim 19 wherein said transducer means comprises;

transmitter means for transmitting a signal to said walls of said room, receiver means for receiving components of said transmitted signal reflected off said walls of said room; and computing means for determining a distance from said user to said walls as a function of the time difference between transmitting said signal and receipt of said reflected components of said transmitted signal.

21. The system for the automatic mapping of a user's position relative to an interior of a building of claim 20 wherein said transducer means further comprises:

doorway detecting means for identifying a presence of an opening in said walls.

22. The system for the automatic mapping of a user's position relative to an interior of a building of claim 19 wherein said transducer means comprises:

means for concurrently measuring a distance between said user and a plurality of walls of a room in which said user is presently located.

23. The system for the automatic mapping of a user's position relative to an interior of a building of claim 19 wherein said inertial guidance means comprises:

accelerometer means for dynamically measuring movement of said user as said user moves through said rooms of said building.

24. The system for the automatic mapping of a user's position relative to an interior of a building of claim 19 wherein said inertial guidance means comprises:

gyroscope means for dynamically measuring movement of said user as said user moves through said rooms of said building.

25. The system for the automatic mapping of a user's position relative to an interior of a building of claim 19 wherein said inertial guidance means comprises:

movement sensor means for dynamically measuring movement of said user using at least one of movement sensors comprising: gyroscopes, accelerometer, rotation detector.

26. The system for the automatic mapping of a user's position relative to an interior of a building of claim 19 wherein said command module means comprises:

mapping means for creating a virtual map of said building using said generated distance data and said user location data for each room traversed by said user.

27. The system for the automatic mapping of a user's position relative to an interior of a building of claim 19 wherein said tracker module means further comprises:

sensor means for measuring at least one of building and user parameters: ambient temperature, presence of toxic gasses, oxygen level in a breathing tank, time to exhaustion of breathable air in the breathing tank, user breathing rate and heart rate sensors, user time in area, a user failure to move indicator, command and control alerts, text readout of messages from the command and control system, voice activation of the unit including the display, location of other users in the vicinity, warning indications.

28. The system for the automatic mapping of a user's position relative to an interior of a building of claim 19 wherein said tracker module means further comprises:

heads-up display means for displaying said map to said user.

* * * * *